(12) United States Patent
Shah et al.

(10) Patent No.: US 10,428,931 B2
(45) Date of Patent: Oct. 1, 2019

(54) BRAZE PREFORM FOR POWDER METAL SINTERING

(71) Applicant: Toyota Motor Engineering & Manufacturing North America, Inc., Erlanger, KY (US)

(72) Inventors: Shail N. Shah, Pleasanton, CA (US); Brady Gambatese, Iowa City, IA (US); Nicholas S. Vernon, Brighton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 349 days.

(21) Appl. No.: 15/443,657

(22) Filed: Feb. 27, 2017

(65) Prior Publication Data
US 2018/0243829 A1 Aug. 30, 2018

(51) Int. Cl.
*F16H 57/08* (2006.01)
*B22F 5/08* (2006.01)
*B22F 7/06* (2006.01)

(52) U.S. Cl.
CPC .......... *F16H 57/082* (2013.01); *B22F 5/08* (2013.01); *B22F 7/062* (2013.01); *B22F 2007/066* (2013.01)

(58) Field of Classification Search
None
See application file for complete search history.

(56) References Cited

U.S. PATENT DOCUMENTS

| | | | |
|---|---|---|---|
| 3,939,736 A | 2/1976 | Morin | |
| 4,838,123 A | 6/1989 | Matoba | |
| 5,098,358 A | 3/1992 | Igaku | |
| 5,382,203 A | 1/1995 | Bellman et al. | |
| 6,527,165 B1 * | 3/2003 | Budinger | B23K 1/0018 228/226 |
| 6,863,636 B2 | 3/2005 | Huber et al. | |
| 6,913,184 B2 | 7/2005 | Dockus et al. | |
| 7,033,301 B2 | 4/2006 | Kimes | |
| 7,527,187 B2 | 5/2009 | Pohlman | |
| 7,556,583 B2 | 7/2009 | Wang et al. | |

(Continued)

FOREIGN PATENT DOCUMENTS

| | | |
|---|---|---|
| JP | 2007268575 A | 10/2007 |
| JP | 2016003672 | 12/2016 |
| JP | 2016003676 | 12/2016 |

*Primary Examiner* — Justin Holmes
(74) *Attorney, Agent, or Firm* — Christopher G. Darrow; Darrow Mustafa PC

(57) ABSTRACT

A planetary carrier subassembly for a transmission is provided that is sintered using braze preforms. The carrier subassembly may include a powder metal carrier member having a plurality of carrier legs extending a distance therefrom, and a powder metal cover member having a plurality of cover legs extending a distance therefrom. The carrier member and cover member are positioned such that respective ends of the carrier legs and ends of the cover legs are aligned with one another. The subassembly is provided with at least one braze preform including a braze material and a sacrificial binder, such as a wax. The braze preform is placed between a respective pair of the aligned carrier legs and the cover legs. The braze preform is provided with a geometry configured to direct a flow of braze material during a subsequent sintering process.

20 Claims, 11 Drawing Sheets

(56) References Cited

U.S. PATENT DOCUMENTS

| | | | |
|---|---|---|---|
| 7,658,315 B2 | 2/2010 | Budinger et al. | |
| 8,042,247 B2 | 10/2011 | Dunkle et al. | |
| 8,187,141 B2 | 5/2012 | Goleski et al. | |
| 8,491,439 B2 | 7/2013 | Kimes | |
| 8,491,440 B2 | 7/2013 | Kimes et al. | |
| 8,500,594 B2 * | 8/2013 | Sefcik | B23P 15/00 29/428 |
| 8,523,550 B2 | 9/2013 | Wehrli et al. | |
| 8,563,142 B2 * | 10/2013 | Bossmann | B23K 1/0018 428/607 |
| 8,574,119 B1 | 11/2013 | Kinter | |
| 8,961,359 B2 | 2/2015 | Floro et al. | |
| 9,034,246 B2 | 5/2015 | Voice | |
| 9,121,276 B2 | 9/2015 | Heidecker et al. | |
| 9,121,282 B2 | 9/2015 | Macelroy | |
| 9,273,737 B2 | 3/2016 | Heuver et al. | |
| 10,107,384 B2 * | 10/2018 | Shah | F16H 3/663 |

| | | |
|---|---|---|
| 2004/0035910 A1 | 2/2004 | Dockus et al. |
| 2004/0077455 A1 | 4/2004 | Huber et al. |
| 2004/0235610 A1 | 11/2004 | Jang et al. |
| 2006/0275607 A1 | 12/2006 | Demir et al. |
| 2007/0081915 A1 | 4/2007 | Trasorras et al. |
| 2009/0062058 A1 | 3/2009 | Kimes et al. |
| 2010/0105515 A1 | 4/2010 | Goleski et al. |
| 2012/0003443 A1 | 1/2012 | Gubanich et al. |
| 2013/0252012 A1 | 9/2013 | Cooper et al. |
| 2015/0030874 A1 | 1/2015 | Wolfgram et al. |
| 2015/0047942 A1 | 2/2015 | Kimes et al. |
| 2015/0061188 A1 | 3/2015 | Hasegawa et al. |
| 2015/0314547 A1 | 11/2015 | Grobl et al. |
| 2015/0367414 A1 | 12/2015 | Kronberger |
| 2016/0061315 A1 | 3/2016 | Taylor et al. |
| 2016/0107235 A1 | 4/2016 | Wilkinson |
| 2016/0129533 A1 | 5/2016 | Cui et al. |
| 2016/0207129 A1 | 7/2016 | Ritchey et al. |
| 2016/0218603 A1 | 7/2016 | Schroth et al. |
| 2017/0252844 A1 | 9/2017 | Hirono et al. |

\* cited by examiner

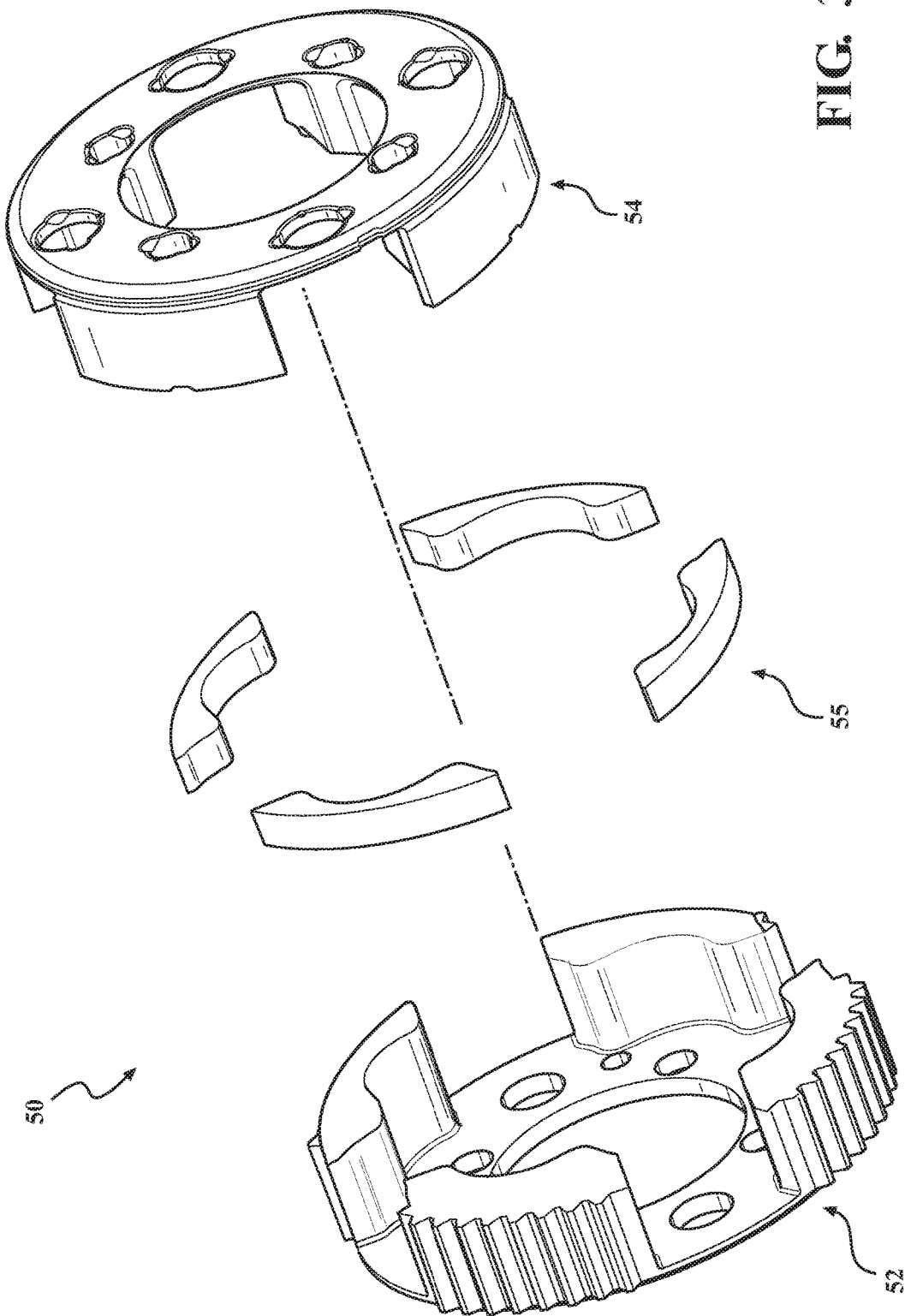

BRAZE PREFORM FOR POWDER METAL SINTERING

TECHNICAL FIELD

The present disclosure generally relates to a braze preform for joining powder metal components and, more particularly, for joining components of a powder metal planetary carrier subassembly for a transmission, and methods for assembling the same prior to sintering.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Transmission components must be high strength and suitable for high torque capacities. Powder metal transmission components provide several technical benefits, and are becoming more attractive from manufacturing strategies and perspectives. Typical powder metal carrier structures may include three or more pieces in order to accommodate the various pinion gears and related components. The pieces may include a cylindrical shell or drum, one or more support member, a backing plate, and various other optional or auxiliary-type structures. The various powder metal transmission components may be sintered and/or brazed together. Brazing techniques may require the careful placement of braze material to ensure equal satisfactory connection between the parts after sintering. For example, inconsistent braze material placement and/or melting may adversely affect capillary flow patterns, which may lead to inconsistent bonds and joints. Inconsistent connections may lead to parts and assemblies that have a variable part strength, which is undesirable.

Accordingly, there remains a need for an improved powder metal carrier assembly that minimizes part count, provides strength and ease of manufacture, with the ability to meet the high torque requirements needed for use in a transmission.

SUMMARY

This section provides a general summary of the disclosure, and is not a comprehensive disclosure of its full scope or all of its features.

In various aspects, the present teachings provide a planetary carrier subassembly for a transmission that is sintered together using braze preforms. The planetary carrier subassembly may include a powder metal carrier member comprising a plurality of carrier legs extending a distance therefrom. A powder metal cover member is provided comprising a plurality of cover legs extending a distance therefrom. The carrier member and the cover member are positioned such that respective ends of the carrier legs are aligned with ends of the cover legs. At least one braze preform is provided, placed between a respective pair of the aligned carrier legs and cover legs. The braze preform comprises a braze material and a sacrificial binder. The braze preform may be provided with a geometry configured to direct a flow of braze material during a subsequent sintering process.

In other aspects, the present teachings provide a method for joining powder metal components. The method includes aligning a plurality of shaped braze preforms with predetermined joint areas of a first powder metal component. Each shaped braze preform includes a braze material and a sacrificial binder. The braze preforms may have a geometry that conforms with a shape of the respective predetermined joint area. The method may include applying a pressure to the braze preforms sufficient to adhere the sacrificial binder to the respective predetermined joint area and prevent relative movement of the braze preforms. The method further includes aligning a second powder metal component with the first powder metal component to form a subassembly, such that the predetermined joint areas of the first powder metal component are aligned with corresponding joint areas of the second powder metal component. The subassembly may be heated to a temperature sufficient to remove the sacrificial binder, and to subsequently direct a flow of braze material to the joint areas. The method includes sintering the subassembly to form a powder metal assembly having braze joints at the predetermined joint areas.

In still other aspects, the present teachings provide a method for forming a planetary carrier assembly for a transmission. The method includes aligning braze preforms with a plurality of carrier legs integrally extending from a powder metal carrier member. The braze preforms may include a braze material and a sacrificial binder. The method includes aligning a plurality of cover legs integrally extending from a powder metal cover member with the plurality of carrier legs of the powder metal carrier member. The alignment is made such that respective ends of the carrier legs and ends of the cover legs are aligned with one another to form a subassembly. The method also includes heating the subassembly to a temperature sufficient to remove the sacrificial binder and to subsequently direct a flow of braze material to predetermined joint areas. The subassembly is then sintered to form the planetary carrier assembly having braze joints between respective pairs of carrier legs and cover legs.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 3 is an exploded perspective view of a carrier subassembly, prior to any sintering process, useful for making the carrier assembly as shown in FIG. 2;

It should be noted that the figures set forth herein are intended to exemplify the general characteristics of the devices and methods among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally relates to a braze preform used for sintering powder metal components. In one non-limiting example, the technology provides a sintered powder metal planetary carrier assembly that is made using braze preforms. Planetary carrier assemblies may be used for accommodating various pinion gears and components of a transmission. A Ravigneaux planetary carrier assembly, in particular, is useful with an automatic automobile transmission. The carrier assembly may include two main sintered metal components, not including any auxiliary components. The first main component is a powder metal carrier member, which generally may include a carrier plate having a plurality of integral carrier legs perpendicularly extending a distance therefrom. The second main component is a powder metal cover member including a cover plate having a plurality of integral cover legs perpendicularly extending therefrom. In various aspects, the carrier assembly is generally arranged such that respective ends of the carrier legs and ends of the cover legs are aligned with and brazed to one another. The arrangement of the carrier member and the cover member defines an interior of the carrier assembly configured to house various pinion gears. At least one braze preform is provided, placed between a respective pair of the aligned carrier legs and cover legs. The braze preform preferably includes at least a braze material portion and a sacrificial binder portion. The braze preform may be provided with a geometry configured to direct a flow of braze material during a subsequent sintering process. For example, once heated, the sacrificial binder melts, evaporates, and/or vaporizes, and the braze material is left in a desired location for the sintering process.

Figure 1:
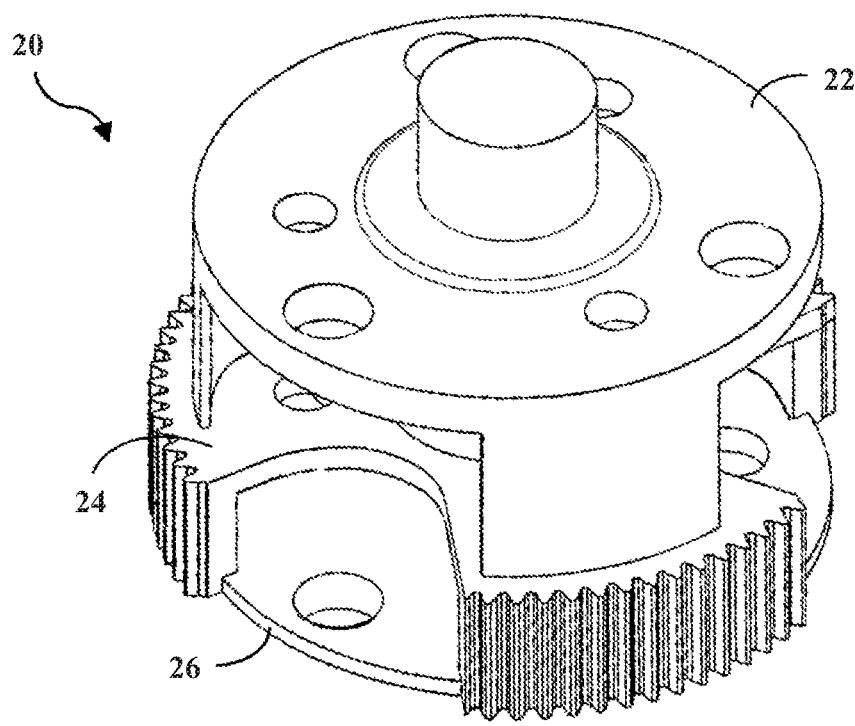
FIG. 1 is perspective view of an exemplary prior art, three-piece, basic Ravigneaux carrier assembly.

Ravigneaux planetary gear structures can be used in automatic transmissions to achieve a variety of gear ratios, and may include two tiers, or decks, of pinion gears that share a common carrier. FIG. 1 is perspective view of an exemplary prior art, three-piece Ravigneaux carrier assembly 20. As shown, the typical three-piece prior art carrier assembly 20 generally includes: (1) a support member 22, (2) a cylindrical shell or drum 24, and (3) a backing, or end plate 26.

In the case of an automatic transmission, various other pieces may be connected to the Ravigneaux planetary gear structures, and may often be referred to as auxiliary pieces or auxiliary components. Common auxiliary components may include a brake hub, clutch, etc. Certain Ravigneaux planetary gear structures have been developed that use an intermediate solid metal annular sleeve coupled to the gear structures that are, in turn, separately coupled to the auxiliary member. The separate connection may require separate connection steps.

Figure 2:
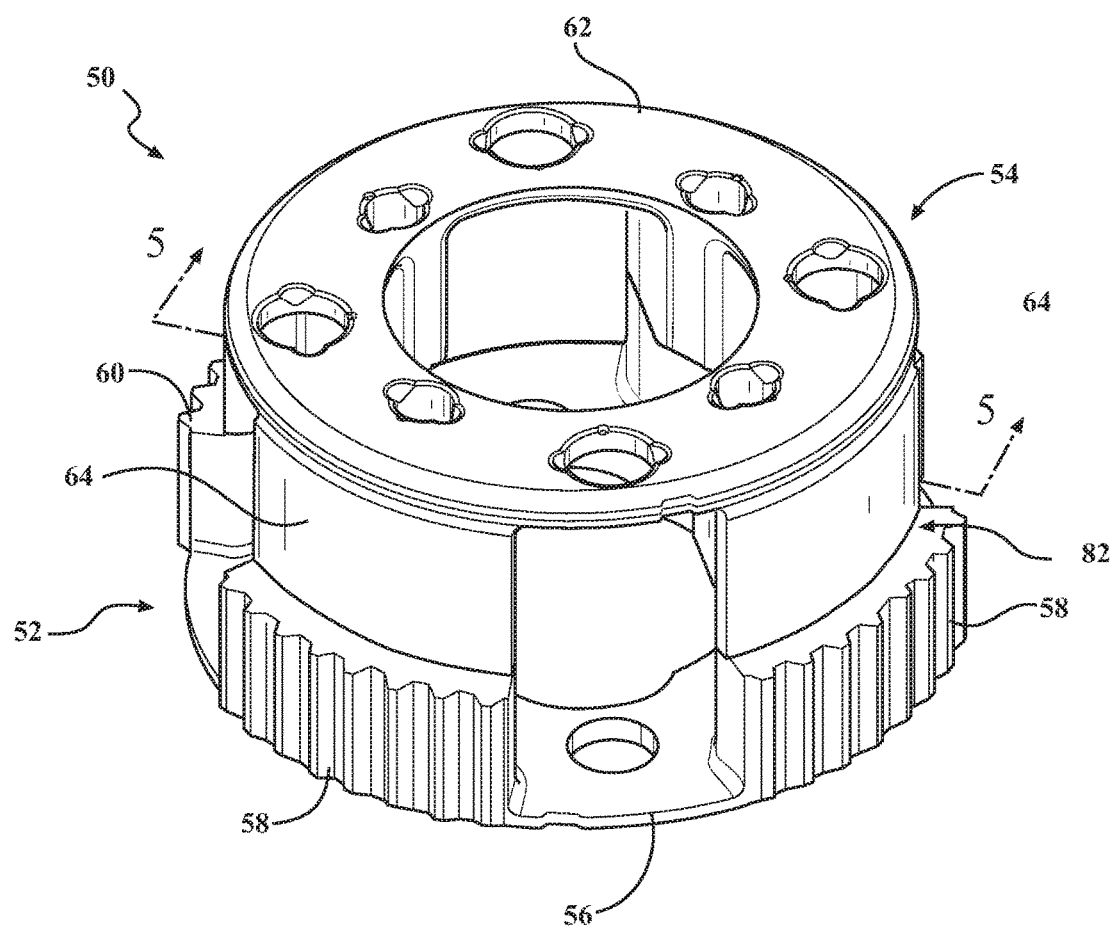
FIG. 2 is a perspective view of a Ravigneaux carrier assembly with a carrier member secured to a cover member according to various aspects of the present disclosure.

FIG. 2 is a perspective view of an exemplary Ravigneaux carrier assembly 50 with a powder metal carrier member 52 secured to a powder metal cover member 54 according to various aspects of the present disclosure. FIG. 3 is an exploded perspective view of a carrier subassembly, prior to any sintering process, useful for making the carrier assembly as shown in FIG. 2. FIG. 3 illustrates a plurality of braze preforms 55 that are aligned between the powder metal carrier member 52 and the powder metal cover member 54.

In various aspects, the carrier member 52 may be a unitary, monolithic component, and includes a substantially circular carrier plate 56 portion including a plurality of angularly spaced-apart carrier legs 58 integral with the carrier plate 56. The carrier legs 58 may be provided with a substantially uniform total length, extending to a free end 60. For example, a distance between an outer face 56a (see, FIG. 7) of the carrier plate 56 and the free end 60 of the carrier leg 58 may generally be the same for each spaced-apart carrier leg 58. Similar to the shape and design of the carrier member 52, in various aspects, the cover member 54 may be a unitary, monolithic component (i.e., formed as one component), and includes a substantially circular cover plate 62 including a plurality of angularly spaced-apart cover legs 64 integral with the cover plate 62. The cover legs 64 may be provided with a uniform total length, extending to a free end 66. For example, a distance between an outer face 62a (see, FIG. 10) of the cover plate 62 and the free end 66 of the cover leg 64 may generally be the same for each spaced-apart cover leg 64. The two-piece carrier assembly 50 may generally be arranged such that respective ends 60 of the carrier legs 58 and ends 66 of the cover legs 64 are, at least partially, aligned with and secured to one another. In various aspects, the respective ends are joined together by braze joints that, by way of non-limiting example, can be formed during a sintering process using suitable brazing material. The arrangement of the carrier member 52 and the cover member 54 defines an interior 80 (see, FIG. 5) of the carrier assembly 50 configured to house various pinion gears and related components.

It should be understood that FIGS. 2, 3, 5, and 7-11, and their related descriptions, are with respect to one presently chosen embodiment of a planetary carrier, and various changes can be made to the design without impacting the overall function, purpose, and operation. In certain aspects, for example, the legs may have unequal sizes, shapes, and/or lengths, in whole or in part, but still form a two-piece carrier assembly. Further, although it may be preferable that the carrier member 52 and cover member 54 be monolithic, unitary components, there may be certain desirable aspects where at least a portion of the carrier member 52 or cover member 54 comprises two or more components mechanically (or otherwise) fastened, secured, or otherwise joined together. Additionally, although the carrier assembly 50 is shown in various figures as including four spaced-apart cover legs 64 joined to four substantially evenly spaced-apart carrier legs 58, it is envisioned that certain designs may utilize a different number of legs.

Powder metallurgy techniques cover a wide range of ways in which materials or components are made from metal powders. As such, the powder metal compositions of the present technology can be tailored to specific or desired end uses. In various aspects, the carrier member 52 and the cover member 54 can comprise the same or substantially similar powder metal composition. In other aspects, it may be desirable that the carrier member 52 and the cover member 54 have different powder metal compositions.

In various aspects, it may be desirable for the carrier assembly 50 to also include auxiliary components, as briefly mentioned above, that cooperate with functions of an automotive transmission. Non-limiting examples of auxiliary components may include brake hubs, sleeves, clutches, one way clutches, races, bearings, etc. Thus, the carrier assembly 50 may include at least one auxiliary component secured to one or both of the carrier member 52 and the cover member 54. It should be understood that an auxiliary component can include a plurality of parts or combined components. In certain aspects, the auxiliary member can be attached using a braze joint or weld.

The present technology broadly relates to methods for joining two or more powder metal components to one another using braze preforms. It should be understood that while various figures and discussions herein may focus on designs for planetary carrier assemblies, this technology is not meant to be limited to carrier assemblies and transmission components, and can be equally useful for joining various other types of powder metal components together.

FIGS. 4A-4H illustrate non-limiting examples of shaped braze preforms 55 according to various aspects of the present disclosure. The shaped braze preforms 55, as detailed in FIGS. 4C-4H, preferably include a braze material 57 and a sacrificial material or binder 59, such as a wax. The braze preforms 55 may be placed between two powder metal components during an assembly process to form a subassembly. The size, shape, and placement location of the braze preforms 55 may each be designed to intentionally optimize braze flow during the sintering process. Through the use of shaped braze preforms, as opposed to the use of just a conventional/known braze material (i.e., conventional pellets), the present technology can meet objectives of providing more uniform braze welds and directed and specifically targeted areas. For example, the braze welds are not only strong, but they are consistently located in the same area. The sacrificial binder 59 may assist with both placement prior to sintering and provide much more control over the flow, and to direct the flow, of melted braze between adjacent powder metal components during the sintering process.

The braze material 57 useful with the present technology is not meant to be limiting, and can include conventional braze materials, used to sinter powder metal components, that eventually melt and flow by gravity and capillary action during the brazing process. Similarly, the sacrificial binder 59 may be include any binder material, such as a wax, sufficient to hold the braze material in place, while melting, evaporating, and/or vaporizing at an appropriate temperature less than the temperature necessary for the sintering process. Preferably the sacrificial binder 59 is non-reactive and does not leave unwanted residue. Non-limiting examples of the sacrificial binder may include flux and wax. Certain waxes include paraffin wax, petroleum wax, and microcrystalline wax. The sacrificial binder preferably decomposes at a temperature much lower than a melting temperature of the braze material. In various aspects, the sacrificial binder will begin to melt at temperatures from about 50° C.-150° C.

Figure 4A:
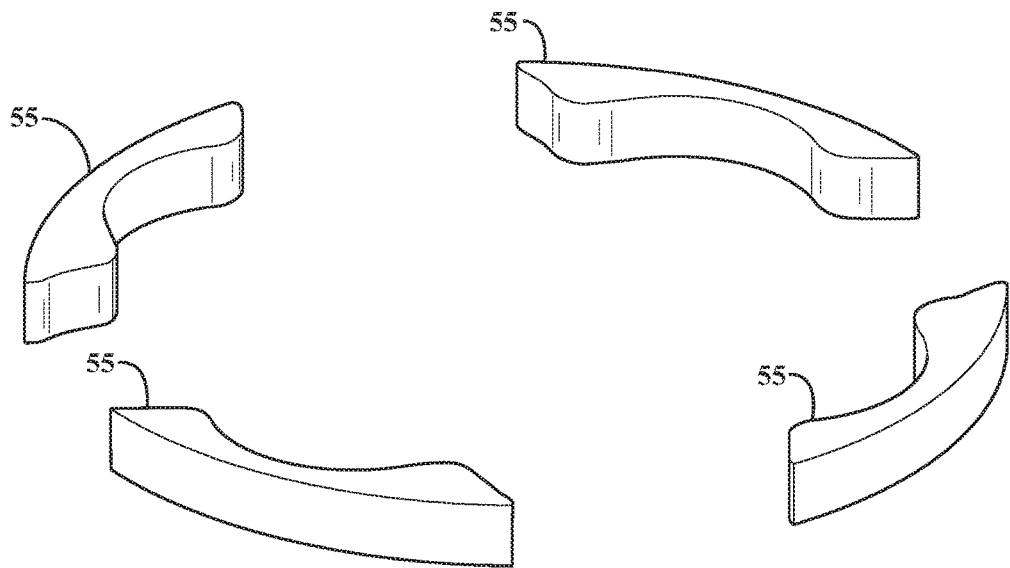
FIGS. 4A-4H illustrate non-limiting examples of braze preforms according to various aspects of the present disclosure.
Figure 5:
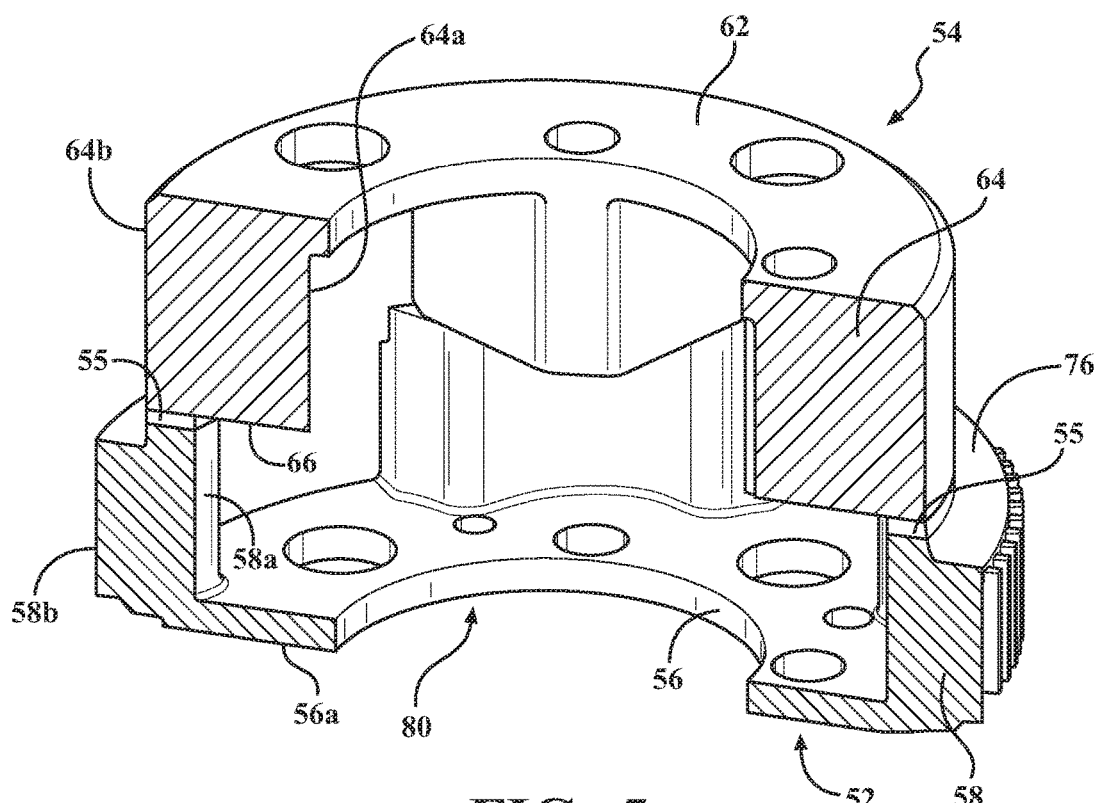
FIG. 5 is a partial cross-sectional view of an assembled subassembly, prior to any sintering process, useful for making a carrier assembly, taken along the line 5-5 of FIG. 2.

FIG. 4A illustrates a plurality of braze preforms 55 that, when individually arranged as shown in FIG. 3, are useful for joining predetermined joint areas of powder metal components, such as the ends of a plurality of powder metal carrier legs 58 with a respective set of powder metal cover legs 64 by a sintering process. FIG. 5 is a partial cross-sectional view of FIG. 2 taken along the line 5-5 that provides additional details of the carrier assembly 50 and location of the braze preforms 55 prior to the sintering process. As shown in FIG. 5, a braze preform may be placed between each respective pair of aligned carrier legs 58 and cover legs 64, and each braze preform 55 may be aligned in a single plane.

Figure 4B:
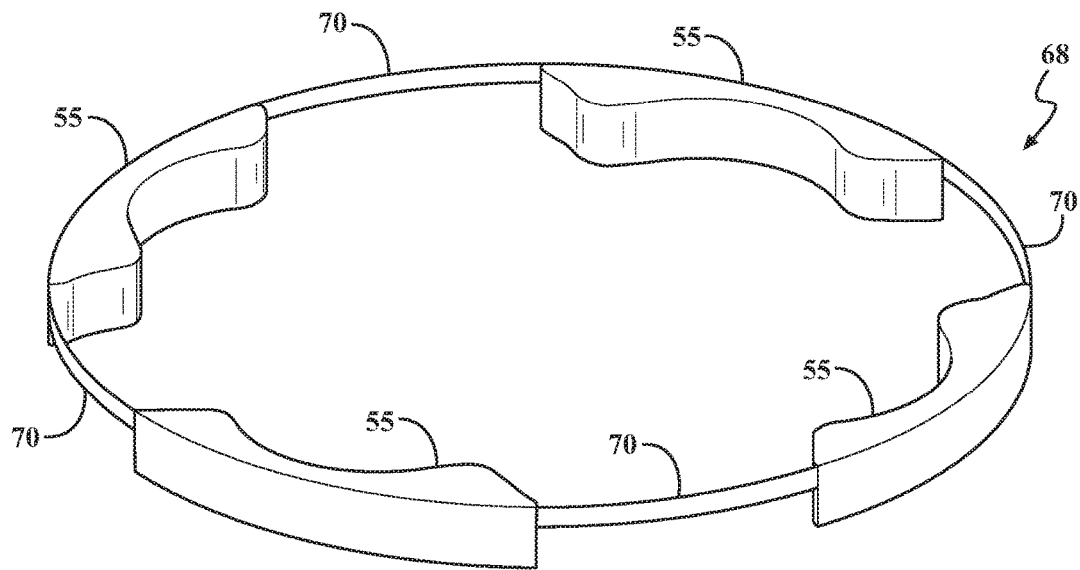

FIG. 4B illustrates a plurality of braze preforms 55 coupled together as a single, unitarily formed braze preform grouping 68 that includes a plurality of coupling portions 70 joining the braze preforms in a spaced apart manner such that they are aligned with predetermined joint areas of the powder metal components, such as the ends 60, 66 of the respective carrier legs 58 and cover legs 64. In various aspects, the coupling portions 70 may comprise the same sacrificial binder 59 that is used in the individual braze preforms 55. For example, the braze preform grouping 68 may be formed using a suitable mold (not shown) with separate compartments for the braze material portions 57, where the mold is subsequently filled with the sacrificial binder 59 that surrounds at least a part of each braze material portion 57 and forms the coupling portions 70. It is also envisioned that the coupling portions 70 may be separate members used to couple the individual braze preforms 55. As discussed in more detail below, excess sacrificial binder, such as the coupling portions 70, may be removed once the braze preforms are properly aligned, and prior to heating the subassembly that will be sintered.

Figure 4C:
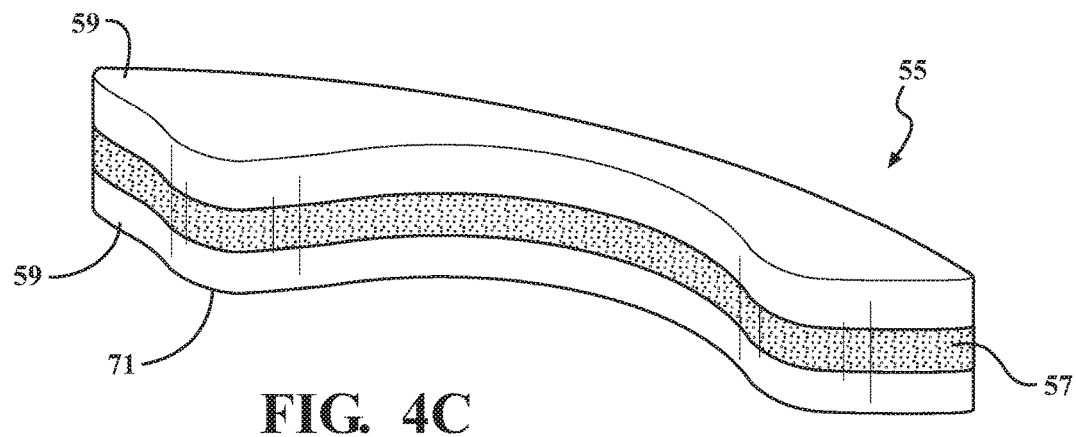

FIG. 4C illustrates a first configuration of a braze preform 55 including a braze material portion 57 disposed as having a substantially uniform thickness film, or layer, placed between two films, or layers, of a sacrificial binder 59. The thickness of the films or layers may vary and are not drawn to scale. In various aspects, the sacrificial binder 59 may only be provided in an amount useful for an intended purpose, for example, to hold the braze material 57 in a proper position at a predetermined joint area prior to sintering. In various aspects, at least a portion of the sacrificial binder 59 may be configured to adhere the braze preform 55 to a portion of the subassembly prior to the subsequent sintering process. As shown, the braze preform 55 may be provided with a geometry defining an outer perimeter 71 that substantially conforms with a geometry of a predetermined joint area of one or both of the powder metal components to be joined. In the specific aspect shown, the braze preform defines an outer perimeter 71 that substantially conforms to the geometry at least one of the ends 60, 66 of the carrier legs 58 and the cover legs 64. It should be understood that this is just one non-limiting example of the shape and size of the braze preform 55 itself, as the shape and size of the individual braze material portion 57, and sacrificial binder 59 may be designed such that they work together and are ultimately configured to guide and direct a flow of the braze material 57 and assist in the capillary action movement of the braze material 57 into the powder metal components during the sintering process. In various aspects, the braze preform 55 may be smaller, and sometimes even larger, than a respective footprint or size of the joint area.

Figure 4D:
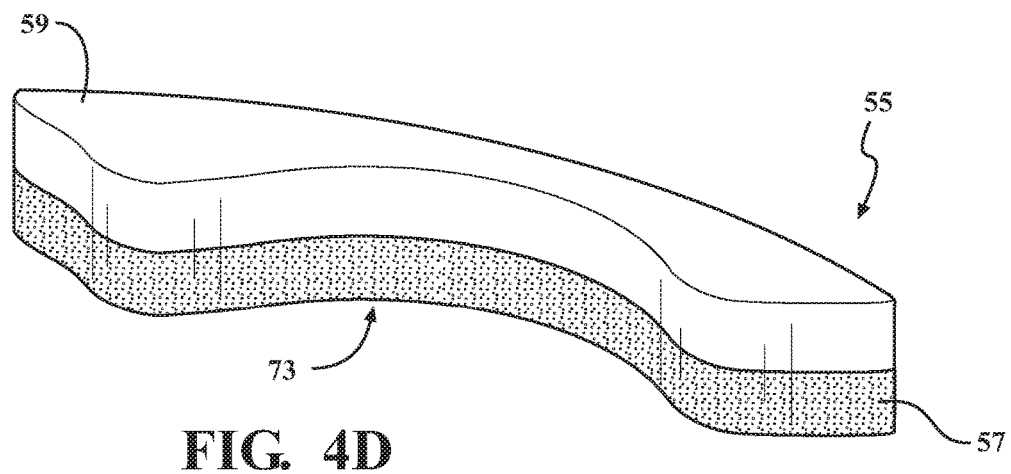

FIG. 4D illustrates a second configuration of a braze preform 55 including a braze material portion 57 disposed adjacent a single layer of a sacrificial binder 59. Although the braze preform 55 is shown with the braze material portion 57 and the sacrificial binder having a similar geometry and outer perimeter, variations of either component may be desired. With the configuration as shown in FIG. 4D, at least a portion 73 of the braze material 57 may be exposed (as a free end) such that it may be positioned in direct contact with the powder metal component, for example, the carrier member 52 or cover member 54 and, more particularly, an end 60, 66 of the carrier leg 58 or cover leg 64.

Figure 4E:
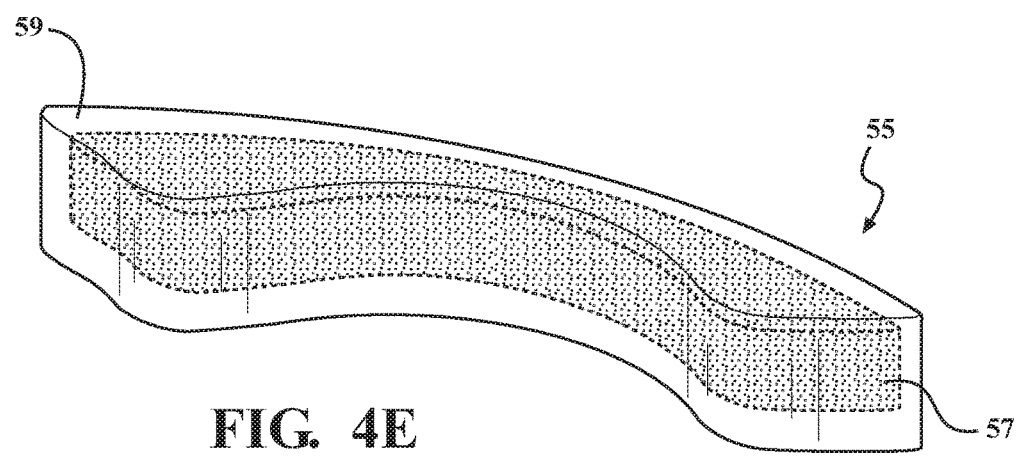

FIG. 4E illustrates a third configuration of a braze preform 55 including a braze material portion 57 fully encapsulated within the sacrificial binder 59, and the sacrificial binder 59 defines the outer perimeter of the braze preform 55, which may substantially conform to a geometry of a portion of the predetermined joint area. In other aspects, the braze material portion 57 may be partially encapsulated in the sacrificial binder 59.

Figure 4F:
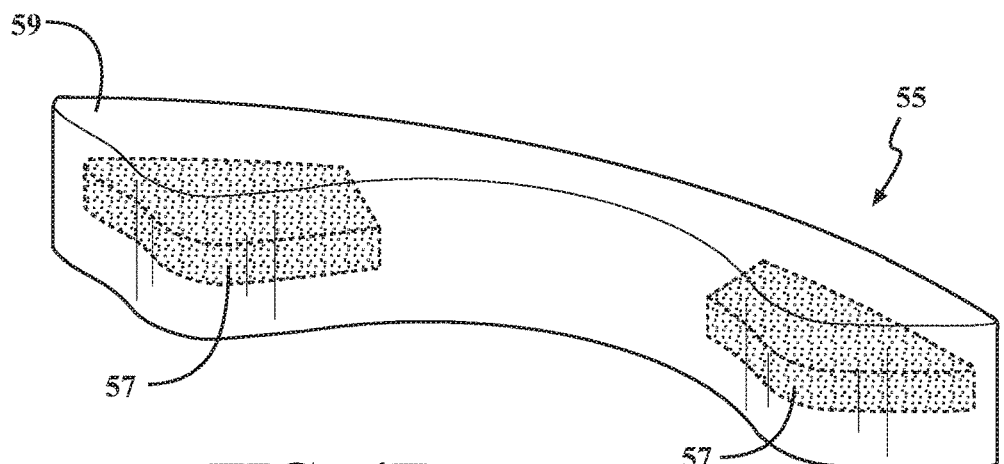
Figure 4G:
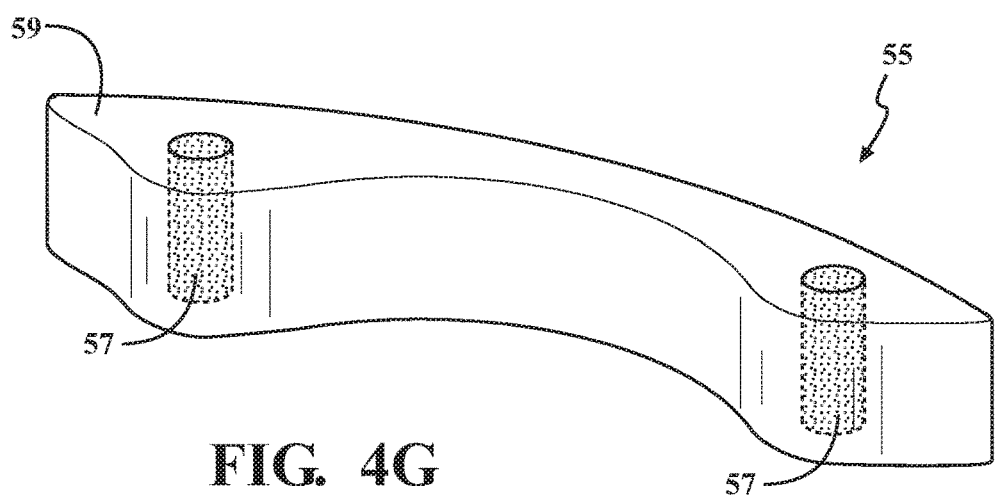
Figure 4H:
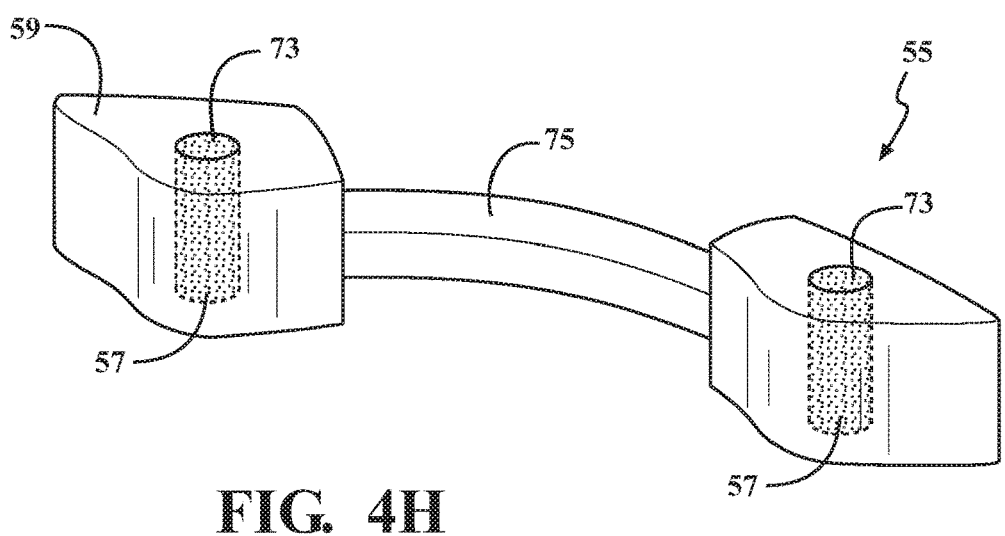

FIG. 4F illustrates a fourth configuration of a braze preform 55 including two separate braze material portions 57 each fully encapsulated within the sacrificial binder 59. FIG. 4G illustrates a fifth configuration of a braze preform 55 including two braze material portions 57 partially encapsulated within the sacrificial binder 59, leaving certain areas, or free ends 73, exposed and available for direct contact with the respective predetermined joint areas of the powder metal components to be joined. FIG. 4H illustrates yet another variation, similar to FIG. 4G, but having a center connecting area 75 that is provided with less sacrificial binder 59, for example, a with a decreased thickness and/or width. It should be understood that various combinations of the features shown in FIGS. 4A-4H may be combined and used together, and the separate non-limiting aspects shown are not meant to be exclusive variations.

With continued reference to FIG. 5, in various aspects, the respective ends 60 of the carrier legs 58 and ends 66 of the cover legs 64 are aligned with and secured to one another with braze preforms 55 that, after sintering, form braze joints 82 (shown in FIG. 6B) disposed in a single plane 74. In certain aspects, an auxiliary component (not shown) may also be secured to the carrier assembly 50 with the braze joint 82 in the same single plane 74, or another plane, for example at an optional ledge 76 defined by the carrier leg 58. As shown, the respective carrier leg 58 and cover leg 64 define respective inner surfaces, or walls 58a, 64a. Although not shown, the walls 58a, 64a may optionally be aligned substantially flush with one another, and respective outer surfaces, or walls 58b, 64b, that may be offset from one another at the location of the braze plane, which may provide a suitable joining surface for an auxiliary member.

The arrangement of the carrier member 52 and the cover member 54 at least partially defines an interior cavity 80 within the carrier assembly 50 configured to house a plurality of pinion gears and various other related components. It should be understood that the shapes of the carrier member 52 and cover member 54 may include many variations. For example, while the bottom of the cover member 54 is shown defining one plane 67, in certain designs, there may be more than one level or plane such that a portion of the free end 66 extends a distance further than the remaining portion.

Figure 6A:
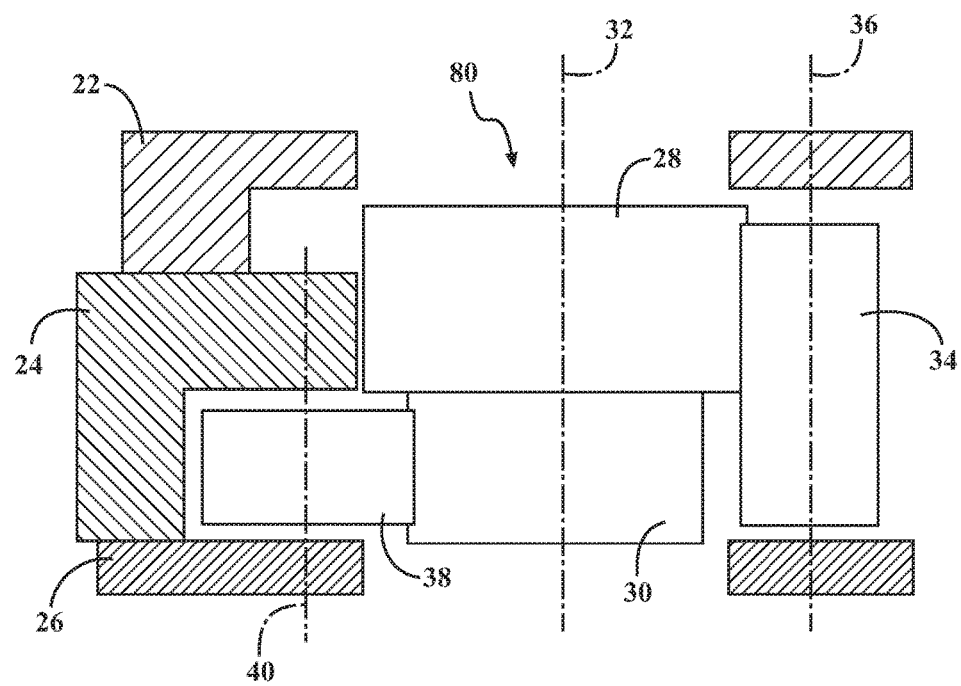
FIG. 6A is a schematic view representing a partial cross-sectional view of the prior art three-piece Ravigneaux assembly of FIG. 1.
Figure 6B:
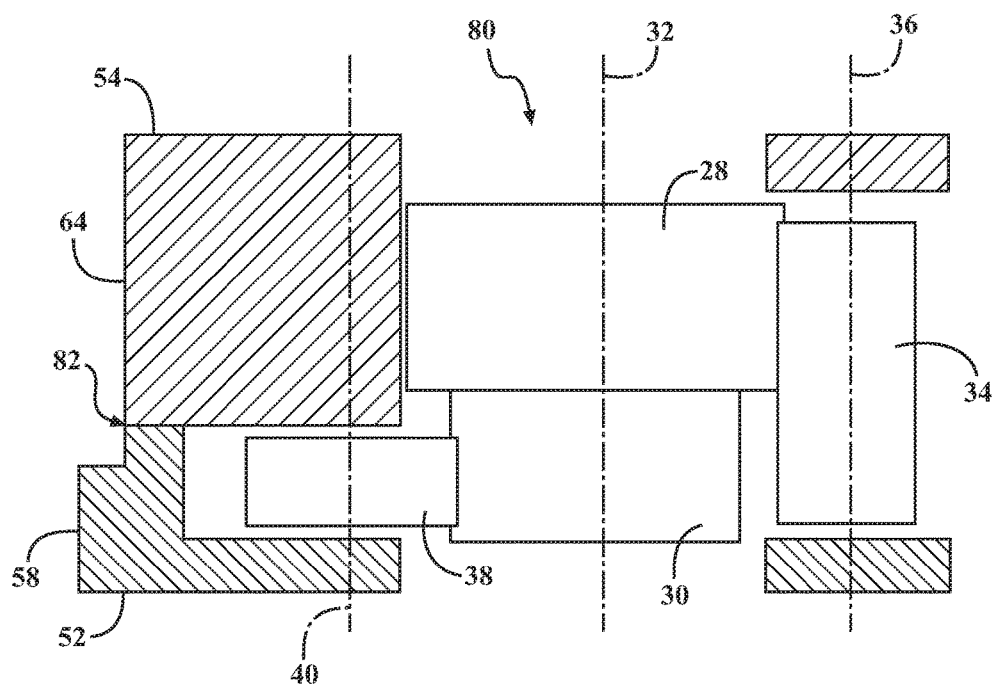
FIG. 6B is a schematic view representing a partial cross-sectional view of the two-piece Ravigneaux carrier assembly of FIG. 2.

FIG. 6A is a schematic view representing a partial cross-sectional view of the three-piece prior art Ravigneaux assembly of FIG. 1. For comparison purposes, FIG. 6B is a schematic view representing a partial cross-sectional view of the Ravigneaux carrier assembly of FIG. 2, according to the present disclosure. Both schematic representations illustrate a configuration with the same large sun gear 28 and small sun gear 30, sharing the same sun axis 36, as well as the same long pinion gear 34 on a long pinion axis 36, and short pinion gear 38 on a short pinion axis 40.

Figure 7:
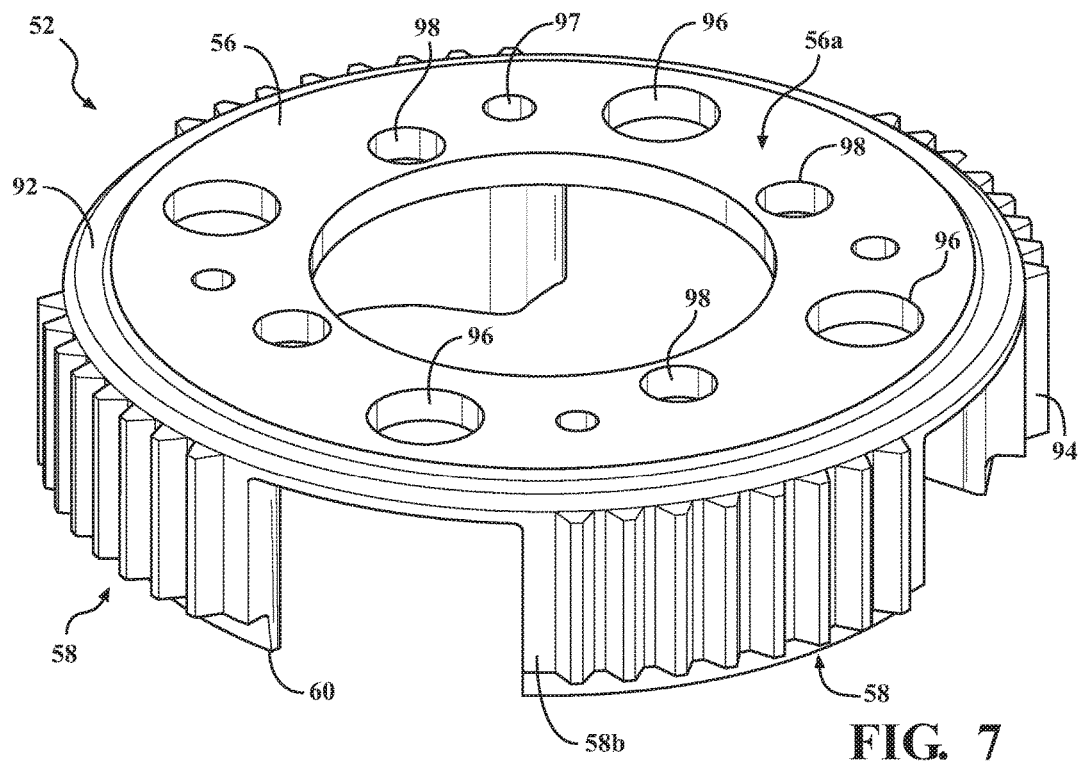
FIG. 7 is a first side perspective view of a powder metal carrier member including a carrier plate with integral carrier legs extending therefrom according to various aspects of the present disclosure.
Figure 8:
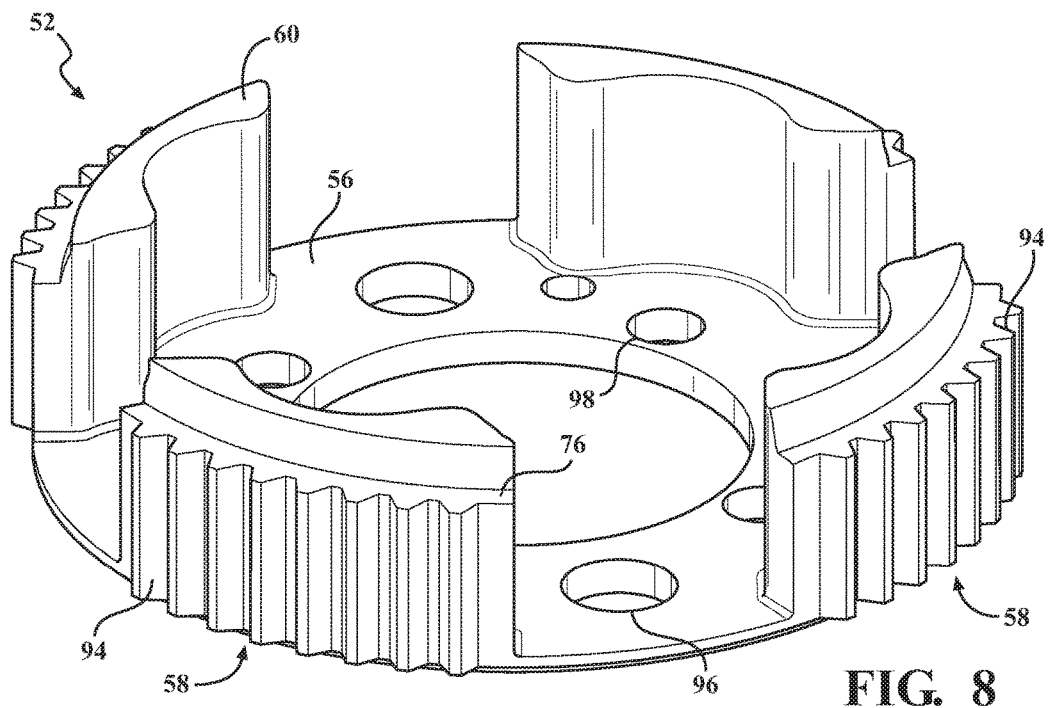
FIG. 8 is a second side perspective view of the powder metal carrier member of FIG. 7.

FIG. 7 is a perspective view of an exemplary powder metal carrier member 52 including a carrier plate 56 portion with integral carrier legs 58 extending therefrom, and FIG. 8 is a bottom plan view of the powder metal carrier member 52 of FIG. 7. The carrier plate 56 may be provided with a substantially circular shape having a flat web surface, or outer face 56a with a lowered or beveled edge 92. In various aspects, the edge 92 may be made by machining. The various inner walls 58a of the carrier legs 58 may be curved or shaped to accommodate the pinion gears and other components. The upper portion of the outer walls 58b of the legs 58 may be substantially aligned with the edge 92 of the outer face 56a. As discussed above, each leg 58 may cooperate to form an optional ledge 76 that may be substantially parallel with the carrier plate 56. In various other aspects, a ledge is not provided and the end 60 is planar as shown in FIGS. 2 and 3. The lower portion of the carrier legs may optionally include spaced-apart splines 94. The carrier plate 56 may be formed with various apertures and other features formed therein, either during the powder metal manufacturing process or machined thereafter. For example, a first plurality of angularly spaced-apart apertures 96 may be provided for the pinion shafts (not shown) of the long pinion gears 34. Similarly, a second plurality of angularly spaced-apart apertures 98 may be provided for the pinion shafts of the short pinion gears 38. Other apertures 97 may also be provided. As shown, the apertures 96, 97, 98 only extend through the carrier plate 56, as the inner walls 58a of the carrier legs 58 are shaped around the second plurality of apertures 98. It should be understood that other configurations of the carrier member 52 may also be used, depending on the design.

Figure 9:
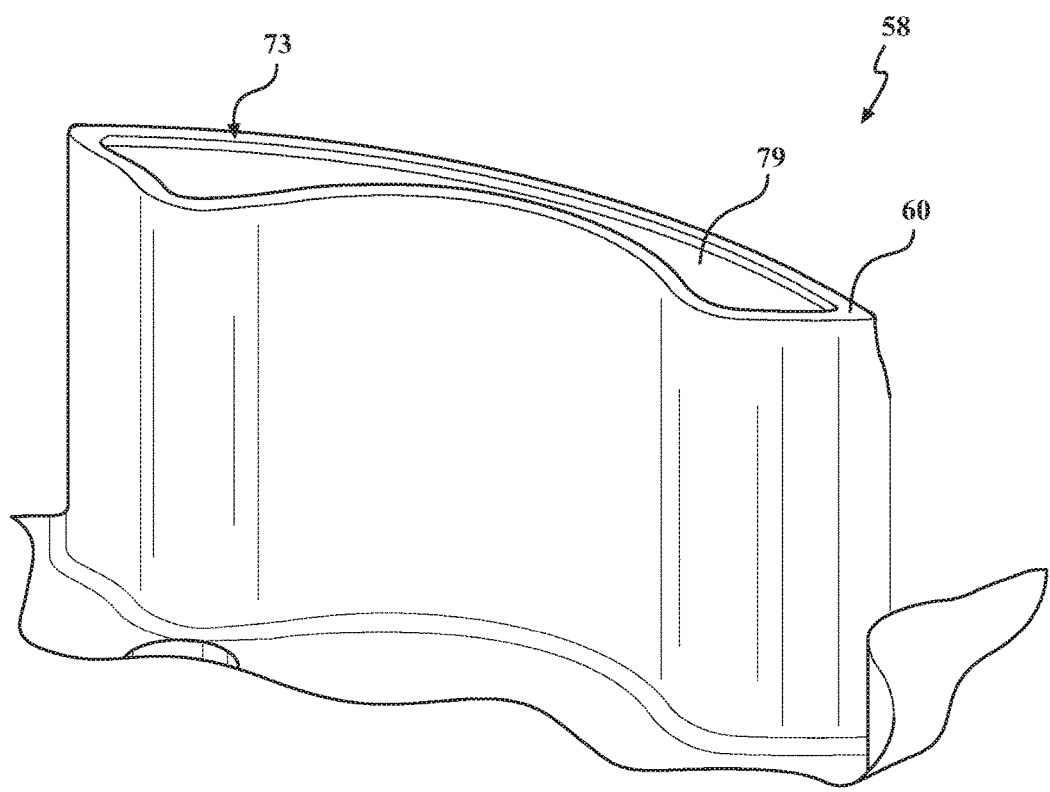
FIG. 9 is partial magnified view of a leg of a powder metal carrier member according to another aspect of the present disclosure.

In various aspects, at least one of the carrier legs 58 (and/or cover legs 64 may define a braze material retention feature 78 in which a suitable braze preform 55 can be placed prior to the sintering. As shown in FIG. 9, for example, the end 66 of the carrier leg 58 may include a pressed, recessed portion or bore 79 suitable for holding the braze preform 55 in place.

Figure 10:
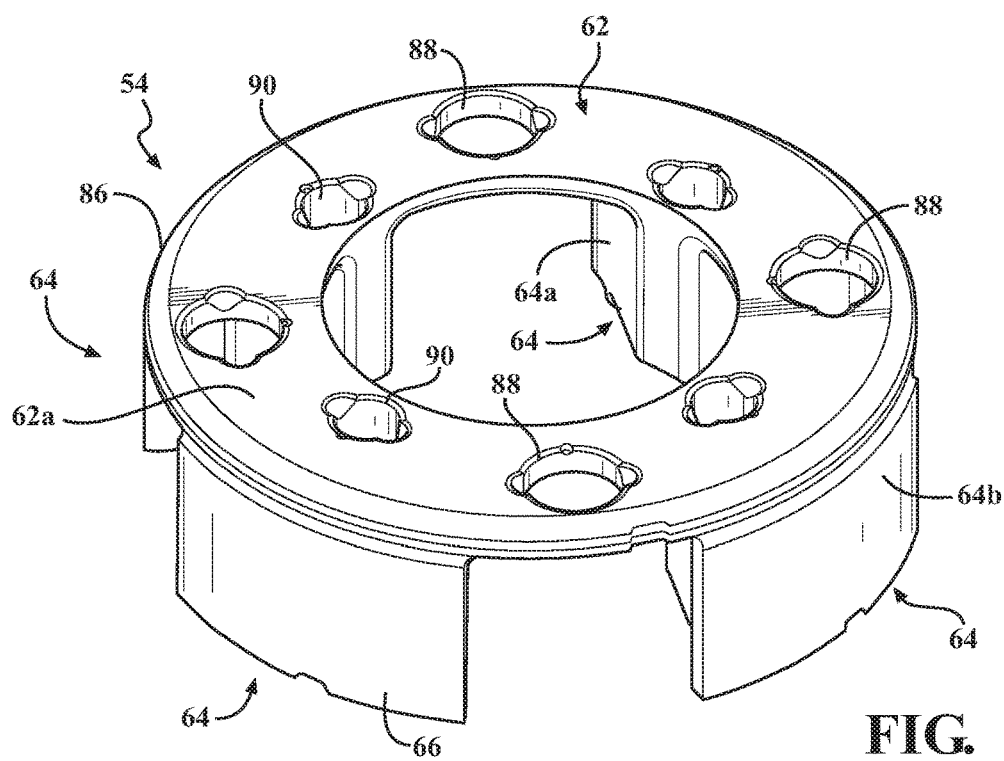
FIG. 10 is a perspective view of a powder metal cover member including a cover plate with integral cover legs extending therefrom according to various aspects of the present disclosure.
Figure 11:
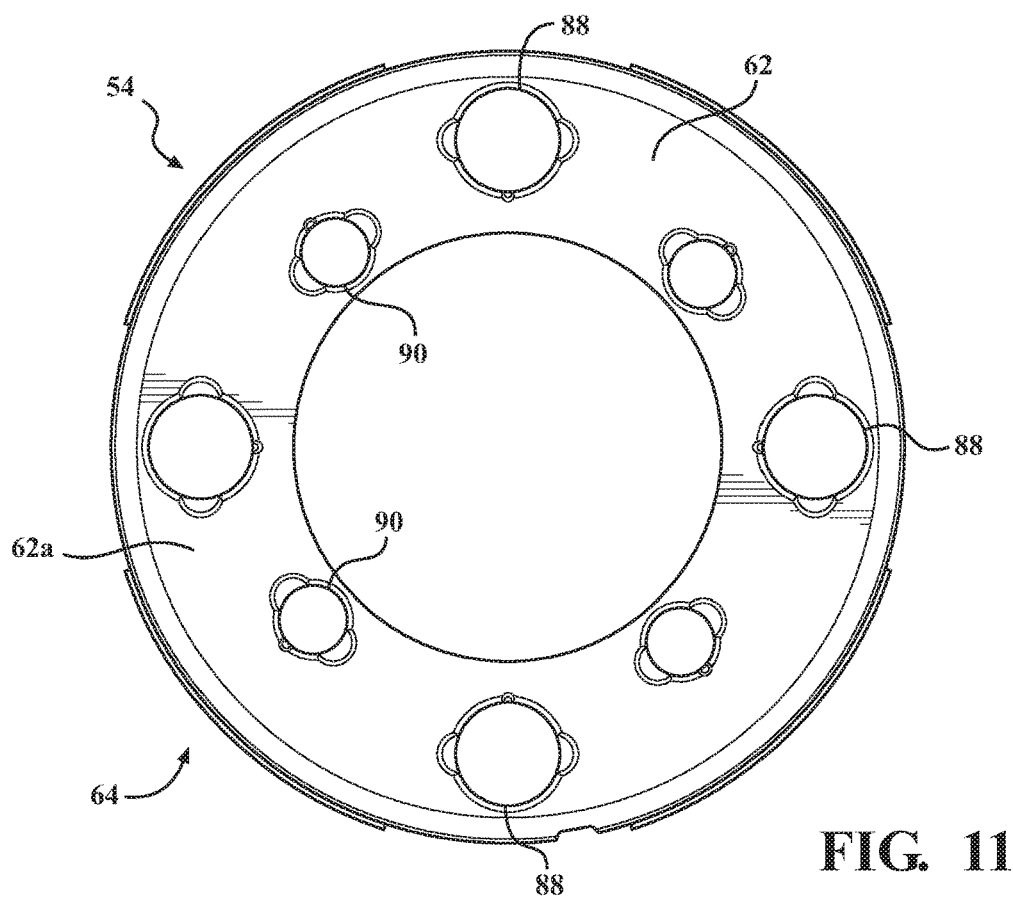
FIG. 11 is a top plan view of the powder metal cover plate member of FIG. 10.

FIG. 10 is a perspective view of an exemplary powder metal cover member 54 including a cover plate 62 portion with integral cover legs 64 extending therefrom, and FIG. 11 is a top plan view of the powder metal cover member 54 of FIG. 10. The cover plate 62 may be provided with a substantially circular shape having a flat web surface, or outer face 62a with an optional chamfered or curved edge 86. In various aspects, the curved edge 86 may be made by machining. The various inner walls 64a of the cover legs 64 may be curved or shaped to accommodate the pinion gears and other components. The outer walls 64b of the legs 64 may be substantially aligned with the edge 86 of the outer face 62a. The cover plate 62 may be formed with various apertures and other features formed therein, either during the powder metal manufacturing process or machined thereafter. For example, a first plurality of angularly spaced-apart apertures 88 may be provided for the pinion shafts (not shown) of the long pinion gears 34. Similarly, a second plurality of angularly spaced-apart apertures 90 may be provided for the pinion shafts of the short pinion gears 38.

As shown, the second plurality of apertures 90 extend through both the cover plate 62 as well as the cover legs 64, while the first plurality of apertures 88 extend through the cover plate 62 portion only. Additional retention features such as shaped apertures, may also be provided. It should be understood that other configurations of the cover member 54 may also be used, depending on the desired design.

In various aspects, the present teachings broadly provide methods for joining powder metal components. The methods may include aligning a plurality of shaped braze preforms 55 with predetermined joint areas of a first powder metal component. Each shaped braze preform 55 may include a braze material 57 and a sacrificial binder 59. The braze preforms 55 may have a geometry that conforms with a shape of the respective predetermined joint area. The methods may include applying a pressure to the braze preforms 55 sufficient to adhere the sacrificial binder 59 to the respective predetermined joint area and prevent relative movement of the braze preforms 55. The methods further include aligning a second powder metal component with the first powder metal component to form a subassembly, such that the predetermined joint areas of the first powder metal component are aligned with corresponding joint areas of the second powder metal component. The subassembly may be heated to a temperature sufficient to remove the sacrificial binder, and to direct a flow of braze material to the joint areas. The methods may include sintering the subassembly to form a powder metal assembly having braze joints at the predetermined joint areas.

As one specific example of the above methods, the present teachings provide methods for assembling planetary carrier assemblies for a transmission, such as a two-component Ravigneaux carrier assembly. The methods may include forming the powder metal components, including the carrier member 52, the cover member 54, as well as the braze preforms 55 with any desired features therein, as described above. The formation of the powder metal components may include shaping and compressing the green powder metal components using suitable molds, as well as using forming rods, etc. The methods may then include aligning a powder metal carrier member 52, which may include a carrier plate 56 having a plurality of integral carrier legs 58 extending therefrom, and a powder metal cover member 54, which may include a cover plate 62 having a plurality of integral cover legs 64 extending therefrom, with braze preforms 55 disposed there between. In various aspects, the alignment results in the predetermined joint areas, i.e., respective ends 60 of the carrier legs 58 and ends 66 of the cover legs 64, being aligned with one another to form a subassembly similar to that best shown in FIGS. 2 and 5. The methods may include applying a slight pressure to the braze preforms 55 sufficient to adhere the sacrificial binder 59 to the respective predetermined joint area(s) and prevent relative movement of the braze preforms 55. In aspects where a braze preform grouping 68 is used, the methods may include removing excess sacrificial binder, such as the coupling portions 70, prior to heating the subassembly. In various aspects, the method may include orienting the braze preforms 55 adjacent to or within a braze material retention aperture 78, as shown in FIG. 9.

Once aligned as a subassembly, the method may include heating the subassembly to a temperature sufficient to remove the sacrificial binder 59 from the preform 55. For example, the sacrificial binder may have a melting point sufficiently low such that the binder melts, evaporates, and/or vaporizes at a temperature sufficiently less than a temperature of the sintering process. The subassembly is then further heated to an elevated temperature to facilitate the sintering process, resulting in the subassembly being secured to one another at predetermined joint areas, such as the respective legs 60, 66 of the carrier member 52 to the cover member 54, brazed together, optionally in a single plane. Additional auxiliary members may be coupled to the carrier assembly 50 after the sintering process.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A planetary carrier subassembly for a transmission, the planetary carrier subassembly comprising:
   a powder metal carrier member comprising a plurality of carrier legs extending a distance therefrom;

a powder metal cover member comprising a plurality of cover legs extending a distance therefrom, the carrier member and the cover member being positioned such that respective ends of the carrier legs are aligned with ends of the cover legs; and a braze preform grouping including a plurality of spaced apart braze preforms joined together with a plurality of coupling portions, wherein the braze preform grouping is placed between a respective pair of the aligned carrier legs and cover legs, wherein each braze preform comprises a braze material and a sacrificial binder, and the braze preform is configured to direct a flow of braze material during a subsequent sintering process.

2. The planetary carrier subassembly according to claim 1, comprising a braze preform placed between each respective pair of aligned carrier legs and cover legs.

3. The planetary carrier subassembly according to claim 2, wherein the braze preforms are aligned in a single plane.

4. The planetary carrier subassembly according to claim 1, wherein each braze material portion is aligned with a respective pair of cover legs and carrier legs.

5. The planetary carrier subassembly according to claim 1, wherein a geometry of the braze preform defines an outer perimeter that substantially conforms with a geometry of at least one of: the carrier legs and the cover legs.

6. The planetary carrier subassembly according to claim 5, wherein the braze material is encapsulated within the sacrificial binder, and the sacrificial binder defines the outer perimeter that substantially conforms to the geometry of the at least one of: the carrier legs and the cover legs.

7. The planetary carrier subassembly according to claim 5, wherein at least a portion of the braze material is positioned in direct contact with the carrier member or the cover member.

8. The planetary carrier subassembly according to claim 1, wherein the sacrificial binder is configured to adhere the braze preform to a portion of the subassembly prior to the subsequent sintering process.

9. The planetary carrier subassembly according to claim 1, wherein the braze material is partially encapsulated within the sacrificial binder.

10. The planetary carrier subassembly according to claim 1, wherein the braze material is fully encapsulated within the sacrificial binder.

11. The planetary carrier subassembly according to claim 1, wherein at least one of the carrier member and cover member defines a retaining feature configured to receive the braze preforms prior to the subsequent sintering process.

12. The planetary carrier subassembly according to claim 1, wherein the sacrificial binder of the braze preforms comprises a wax.

13. A method for joining powder metal components, the method comprising:
aligning a braze preform grouping with predetermined joint areas of a first powder metal component, the braze preform grouping including a plurality of shaped braze preforms joined together with a plurality of coupling portions, each shaped braze preform: comprising a braze material and a sacrificial binder, and conforming with a shape of the respective predetermined joint area;
applying a pressure to the braze preforms sufficient to adhere the sacrificial binder to the respective predetermined joint area and prevent relative movement of the braze preforms;

aligning a second powder metal component with the first powder metal component to form a subassembly, such that the predetermined joint areas of the first powder metal component are aligned with corresponding joint areas of the second powder metal component;
heating the subassembly to a temperature sufficient to remove the sacrificial binder and to subsequently direct a flow of braze material to the joint areas; and
sintering the subassembly to form a powder metal assembly having braze joints at the predetermined joint areas.

14. The method according to claim 13, further comprising removing excess sacrificial binder prior to heating the subassembly.

15. The method according to claim 13, wherein at least one of the powder metal components defines a braze material retention feature, and the step of aligning the plurality of braze preforms comprises orienting the braze preforms adjacent respective braze material retention features.

16. A method for forming a planetary carrier assembly for a transmission, the method comprising:
aligning braze preforms with a plurality of carrier legs integrally extending from a powder metal carrier member, the braze preforms comprising a braze material and a sacrificial binder that includes a wax;
applying a pressure to the braze preforms sufficient to adhere the wax to an end of at least one of the carrier legs to prevent relative movement of the braze preforms;
aligning a plurality of cover legs integrally extending from a powder metal cover member with the plurality of carrier legs of the powder metal carrier member, such that respective ends of the carrier legs and ends of the cover legs are aligned with one another to form a subassembly;
heating the subassembly to a temperature sufficient to remove the sacrificial binder and to subsequently direct a flow of braze material to predetermined joint areas; and
sintering the subassembly to form the planetary carrier assembly having braze joints between respective pairs of carrier legs and cover legs.

17. The method according to claim 16, wherein each of the plurality of carrier legs defines a braze material retention feature, and the step of aligning the braze preforms comprises orienting the braze preforms adjacent respective braze material retention features.

18. The method according to claim 16, wherein the braze preforms are provided as a braze preform grouping that includes a plurality of braze material portions and a sacrificial binder, and the step of aligning the braze preforms comprises aligning each braze material portion of the braze preform grouping with a respective carrier leg or cover leg.

19. The method according to claim 16, further comprising removing excess sacrificial binder prior to heating the subassembly.

20. The method according to claim 16, wherein the sacrificial binder of the braze preforms comprises a wax, and applying the pressure to the braze preforms adheres the wax to the respective predetermined joint area and prevents relative movement of the braze preforms.

* * * * *